United States Patent Office 2,775,517
Patented Dec. 25, 1956

2,775,517

PROCESSES FOR TREATING NICKEL BEARING IRON ORES

Edgar B. Mancke, Bethlehem, Pa., assignor to Bethlehem Steel Company, a corporation of Pennsylvania No Drawing. Application October 4, 1951,
Serial No. 249,805

5 Claims. (Cl. 75—1)

This application is a continuation-in-part of application Serial No. 61,723 for "Processes for Treating Nickel Bearing Iron Ores," filed November 23, 1948, now abandoned.

My invention is directed to a process of treating iron ores containing nickel to separate nickel from the ore. It is particularly directed to the treatment of ores having such high contents of iron as to make them valuable as a source of iron and steel but also having such a content of nickel as to render them unsuitable for the general production of iron and steel unless most of the nickel is first removed from such ores. It is also directed to the treatment of iron ores containing both nickel and chromium to remove chromium and nickel.

While nickel is a valuable constituent of many steels for special purposes it is undesirable in most steels in amounts great enough to substantially affect the properties of the steels. In fact it is important to keep the nickel content as low as is practical in ore which is to be used in general steel making as nickel is frequently present in scrap in appreciable amounts and therefore the "hot metal" or "pig iron" which is to be used in making steel should be as low in nickel content as is practically possible to avoid nickel being above permissible tolerances in the steel.

An important purpose of my invention is to treat the nickel bearing iron ores to produce an iron ore as low as possible in nickel so that such ores may be used for the preparation of iron and steel which is not contaminated with an amount of nickel in excess of the accepted tolerances for steels for general use.

My invention is particularly applicable to iron ores of the Mayari type. In Cuba and in various other places there are very large deposits of these ores. They are oxidic ores having very low sulphur and phosphorus contents which have a very high content of iron but as yet these ores have not been utilized except for certain limited purposes for iron and steel making because of the fact that they contain nickel in amounts which prevent their being directly used as iron ores in the general manufacture of iron and steel. Various attempts have been made to beneficiate these ores for iron and steel making by removing the nickel but these attempts have been unsuccessful largely because of the great difficulty of lowering the nickel content to a sufficient extent by any means which would be economically feasible. This difficulty in lowering nickel to the necessary extent is primarily due to the fact that a substantial part of the nickel is in such a state or is so bound to or combined with the other constituents of the ore as not to be easily removed from the ore.

In describing my invention I shall refer to Mayari iron ores in illustrating the principles and steps of my process. Mayari iron ores as they occur in nature contain considerable "free water" and also a substantial amount of "combined water." Analyses of the calcined ores vary considerably but in general they run within ranges approximately as follows:

|       | Percent |              |
|-------|---------|--------------|
| Fe    | 54      |              |
| Ni    | 1.0     | 0.25 to 1.56 |
| Cr    | 2.2     | 2.0 to 2.7   |
| Co    | 0.15    | 0.05 to 0.35 |
| Mn    | 0.5     | 0.24 to 1.76 |
| $SiO_2$ | 5.0   | 1.6 to 7.0   |
| $Al_2O_3$ | 10.0 | 6.0 to 14.0 |

In this table of analyses, the first column indicates the constituents of the ore; the second column indicates an average analysis; and the remainder of the table indicates the ranges. When, in this specification, I refer to Mayari type ores I mean those ores which, like the Mayari ores, have a high content of iron and contain nickel in a substantially lesser amount but still in an amount too great for general iron and steel making, and in which ores the nickel is difficult to reduce to the necessarily small amounts required for general iron and steel making.

It will be noted that in the above ranges of analyses cobalt is present. This element behaves in some respects like nickel in irons and steels. In the processes I shall hereafter describe in this specification cobalt is removed from the ore with the nickel.

My invention comprises the step of leaching nickel bearing iron ore with an aqueous solution containing an iron salt of the group of acids consisting of hydrochloric and sulfuric acid, namely ferrous or ferric chloride, or ferric or ferrous sulphate, or mixtures of these salts.

My invention also comprises the step of roasting the ore with an alkali prior to the leaching with an iron salt. As stated above, the nickel in Mayari type ores is in such a state or is so bound to the other constituents of the ore as not to be readily dissolved and removed from the ore. I have discovered that if the ore is first roasted with an alkali and then leached the condition of the nickel in the ore is so modified, or the association of nickel and other constituents of the ore is so broken down, as to render the nickel of the ore soluble in the iron salt solution to such an extent that the nickel can be removed from the ore to reduce the nickel content in the ore to a very small amount, such an amount in fact, as to produce iron and steel having a nickel content for tolerances permissible according to accepted standards in general steel-making.

In effecting the roasting operation with an alkali I may use hydroxides, carbonates, or bicarbonates or mixtures of these compounds of either sodium or potassium. Of course, for reasons of economy I usually employ a compound of sodium. When, in the claims, I refer to a carbonate the term is to be construed as signifying either the carbonate or the bicarbonate or mixtures thereof.

I shall now give a specific example of my process to illustrate the practice of my invention, it being understood that this example is but an illustration of carrying out the process.

Mayari ore is subjected to a hydroseparation operation to remove the coarser material and it is then ground to minus 200 mesh. The hydroseparation removes part of the chromium. The ore is then intimately mixed with sodium bicarbonate in a very fine condition. Preferably the ore and bicarbonate are wet mixed as this gives a more intimate mixing of ore and reagent. In the present example the weight of sodium bicarbonate used is equal to the weight of the ore being treated, the weight of the ore being figured as that of the ore in a calcined condition. (It is to be noted that it is not necessary to actually calcine the ore before the alkali roast.) This mixture of ore and sodium bicarbonate is now roasted at a temperature of 1740° F. for one hour.

The product of the roasting operation is ground and then leached with water at 180° F. for two hours, after which it is washed and filtered. This leaching removes most of the sodium compounds. Most of the chromium is removed during this leaching together with considerable amounts of the alumina and silica. In this particular example the chromium content of the ore is reduced from 1.6% to 0.05%.

The ore is now ready for the iron salt treatment to dissolve out most of the nickel and cobalt. While still moist from the previous leaching, it is mixed with a ferric chloride solution. In this particular example, the ferric chloride solution contains 25.6 grams per liter of iron as ferric chloride. The amount by weight of this ferric chloride solution used is twice the weight of the moist ore with which it is mixed. The mixture of ore and iron salt solution is kept at a temperature of 180° F. for seven hours. It is then autoclaved at a temperature of 400° F. for one half hour.

After autoclaving the slurry it is run into thickener tanks where it is washed with water, as, for example, by countercurrent decantation. After thorough washing the treated ore has had its nickel content reduced from 1.1% to less than 0.05%, both percentages being in terms of calcined material. Most of the cobalt has also been removed.

Part of the solution containing the nickel and cobalt, and also considerable ferric chloride, is treated to remove the nickel and cobalt from solution, as, for example, by precipitating with sponge iron. When sponge iron is used as a precipitant for the nickel and cobalt there will be reduction of the ferric chloride to ferrous chloride. In this case the ferrous chloride is oxidized by the use of oxygen in a pressure vessel or by treating the solution with chlorine gas to oxidize the ferrous iron to the ferric condition making it suitable for re-use in the leach. This part of the solution is recirculated to leach more ore. The remaining part of the nickel and cobalt solution is evaporated and roasted to remove constituents such as alumina, magnesia, manganese, soda, and incidentally some iron. These constituents build up in the leach solution because they are dissolved during the ferric chloride treatment of soda roasted ore. The hydrochloric acid and vapor obtained from evaporation and roasting is returned to the leach tank where the acid will react with some iron in the ore to form ferric chloride.

In the example of ore treatment just given, the various conditions of treatment have been set forth specifically. Many of these conditions can be varied considerably and the process still be effective and still come within my invention.

The amount of alkali reagent to mix with the ore preparatory to roasting varies considerably. It will be apparent that less sodium carbonate would be necessary than sodium bicarbonate, and still less if sodium hydroxide were used, since a given weight of sodium hydroxide contains a higher percentage of sodium oxide than sodium carbonate and a given weight of sodium carbonate contains a higher percentage of sodium oxide than sodium bicarbonate. It will also be readily apparent that the amount of reagent will vary with the characters and analyses of the ores to be treated. In the above example, a weight of bicarbonate equal to the weight of the ore is employed. Frequently it is unnecessary to use as much as this but at times it is necessary to use more. In general, the amount of alkali used should be substantially in excess of that necessary for reacting with the chromium and aluminum in the ore.

The time of roasting may also vary considerably. In the above example the time is one hour but the requisite time may be more or less depending upon circumstances such as temperatures of roasting and the different analyses and characters of the ores. I have obtained satisfactory results in a fifteen minute roast. Usually, however, I employ a roast of about one hour. Longer roasts than one hour are sometimes useful, and, even when unnecessary, the longer times are not harmful.

The temperatures of roasting may vary considerably. Usually I employ a temperature of from 1700° F. to 2000° F.

In the above example of my process the alkali roasted ore, which has been leached to remove some of the chromium, alkali compound, and various soluble compounds, was mixed while still moist with a solution of ferric chloride. This mixing of the ore with the iron salt solution while the ore is still moist is important, as I find that unless the ore is still moist when mixed with the ferric chloride solution I do not get as effective removal of nickel by treatment with the solution of ferric chloride and the subsequent washing.

In the above example of my process a particular strength of ferric chloride solution is specified. I find that the concentration of solution may vary considerably. The same is true of the amounts of solution employed. These conditions vary considerably depending upon the analyses and characters of the ores being treated. The same is true as to lengths of time of treatment with iron salt solution. The temperature at which the ore is treated with the iron salt solution may vary somewhat but it is preferable to have a high temperature.

In the above example the iron salt used is ferric chloride. Ferric sulphate behaves somewhat similarly to ferric chloride but with some ores it is not quite as effective as ferric chloride in the removal of nickel.

Ferrous chloride or ferrous sulphate may also be employed. Usually, however, when using a ferrous salt I prefer to employ an aqueous solution containing both ferrous and ferric salts. An example of the use of a solution of both ferrous and ferric salts follows: A solution is prepared containing 25.3 grams per liter of iron as ferric chloride and 71.5 grams per liter of iron as ferrous chloride. This solution is mixed with ore which has already been subjected to an alkali roast and leached to remove chromium and the other water soluble constituents. The mixing of treated ore and iron salt solution is effected while the ore is still moist. Ten parts by weight of iron salt solution is used for each part by weight of moist ore. The mixture of ore and iron salt solution is held at 183° F. for four hours and then the solution and treated ore are separated. The ore is now mixed with fresh solution and maintained at 183° F. for two hours. After separation of solution and ore the ore is given a third treatment with fresh iron salt solution for two hours at 183° F., following which the treated ore and solution are separated. The treated ore is now washed with water and calcined. The product thus obtained contains a very low content of residual nickel and is adapted to be used for the production of ordinary irons and steels containing the requisite low amounts of chromium and nickel.

In this example, as in the previously described example, the conditions may vary considerably from those specifically given. The length of time of leaching, the concentration of the iron salt solution and the amount of solution used will vary with the analyses and characteristics of the different ores. The relative amounts of ferrous and ferric salts present may vary considerably. In the example, last given, the ferrous salt is present in considerably greater amount than the ferric salt. With some ores, however, a solution containing more ferric salt than ferrous salt is somewhat more effective.

In the first specific example, given above, the process included the step of autoclaving the mixture of ore and iron salt solution, while in the second specific example, given above, this step was not included. While the step of autoclaving at an elevated temperature is not vital in the treatment of all iron ores containing nickel, it is usually preferable to employ it. When autoclaving is not employed it is difficult to separate solution and ore, as, for example, by settling or filtering. The autoclaving greatly improves the separation of ores from solution. Moreover autoclaving at an elevated temperature facilitates the reaction between the iron salt and the compounds of nickel and cobalt in the ore.

Instead of holding the slurry of the ore in iron salt solution for some time prior to autoclaving, as in the first specific example given above, the slurry, when first made, may be immediately autoclaved. When this is done the time of treatment with the iron salt is considerably shortened as the use of the higher temperature incidental to autoclaving hastens the solution of the nickel and cobalt.

I find that with some ores the action of the iron salt leaching solution is somewhat improved when it contains some ammonium chloride or sulphate. For example, 25 grams per liter of ammonium chloride, or sulphate, frequently enables me to obtain a product which is somewhat lower in nickel than when the ammonium salt is omitted.

I find that with some ores my process is improved by subjecting the ore, which has been roasted with alkali and leached, to a partial reducing roast prior to treatment with the iron salt solution. An example follows:

Mayari ore is roasted with an alkali, as described above, leached with water to remove alkali, chromium and other water soluble compounds and then dried. It is then roasted for three hours at 1400° F. in a gas mixture consisting of 75% nitrogen, 14% hydrogen and 11% water vapor. At the end of three hours the iron has been reduced largely to magnetite ($Fe_3O_4$) with possibly some of the iron of the ore being reduced to a greater degree than to $Fe_3O_4$.

The partially reduced ore is cooled in a non-oxidizing atmosphere, either an atmosphere which is at least partially reducing or an atmosphere of an inert gas, and such partially reduced ore should be protected against oxidation until it is ready to leach. The ore thus treated is now subjected to leaching with the iron salt solution in the manner already set forth above.

I claim:

1. In a process for beneficiating Mayari type iron ore, the steps of roasting the ore with an alkali, washing the ore with water to remove chromium and most of the alkali, leaching the ore with a solution containing a ferric salt of an acid contained in the group consisting of hydrochloric and sulphuric acids, autoclaving the mixture of ore and ferric salt solution, and separating the solution containing most of the nickel in the ore from the ore.

2. In a process for beneficiating Mayari type iron ore, the steps of roasting the ore with an alkali, washing the ore with water to remove chromium and most of the alkali, leaching the ore with a solution containing an iron salt of an acid contained in the group consisting of hydrochloric and sulphuric acids, autoclaving the mixture of ore and iron salt solution and separating the solution from the ore.

3. In a process of beneficiating Mayari type iron ore containing chromium, nickel and cobalt, the steps of roasting the ore with alkali, leaching with water to remove chromium and alkali, and then leaching the ore with a solution containing ferric and ferrous salts of an acid contained in the group consisting of hydrochloric and sulphuric acids to remove nickel.

4. In a process of beneficiating Mayari type iron ore containing chromium and nickel, the steps of roasting the ore with an alkali, leaching with water to remove chromium and alkali, subjecting the ore thus treated to a reducing roast to partially reduce the ore, and leaching the partially reduced ore with a solution containing an iron salt of an acid contained in the group consisting of hydrochloric and sulphuric acids to remove nickel and cobalt.

5. In a process of beneficiating Mayari type iron ore containing chromium, nickel and cobalt, the steps of roasting the ore with alkali, leaching with water to remove chromium and alkali, mixing the treated ore while still moist with an aqueous solution containing an iron salt of an acid contained in the group consisting of hydrochloric and sulphuric acids to dissolve nickel and cobalt, and washing the treated ore to remove nickel and cobalt.

References Cited in the file of this patent

UNITED STATES PATENTS

| | | |
|---|---|---|
| 603,797 | Storer | May 10, 1898 |
| 937,293 | Elliott et al. | Oct. 19, 1909 |
| 1,575,852 | McCormack | Mar. 9, 1926 |
| 1,636,296 | Elliott | July 19, 1927 |

OTHER REFERENCES

Ephraim, F., "Inorganic Chemistry," Edited by Thorne and Roberts, Nordeman Publishing Co., Inc., New York, N. Y. (1943), 4th ed., pages 824 and 825.